Figure 1:
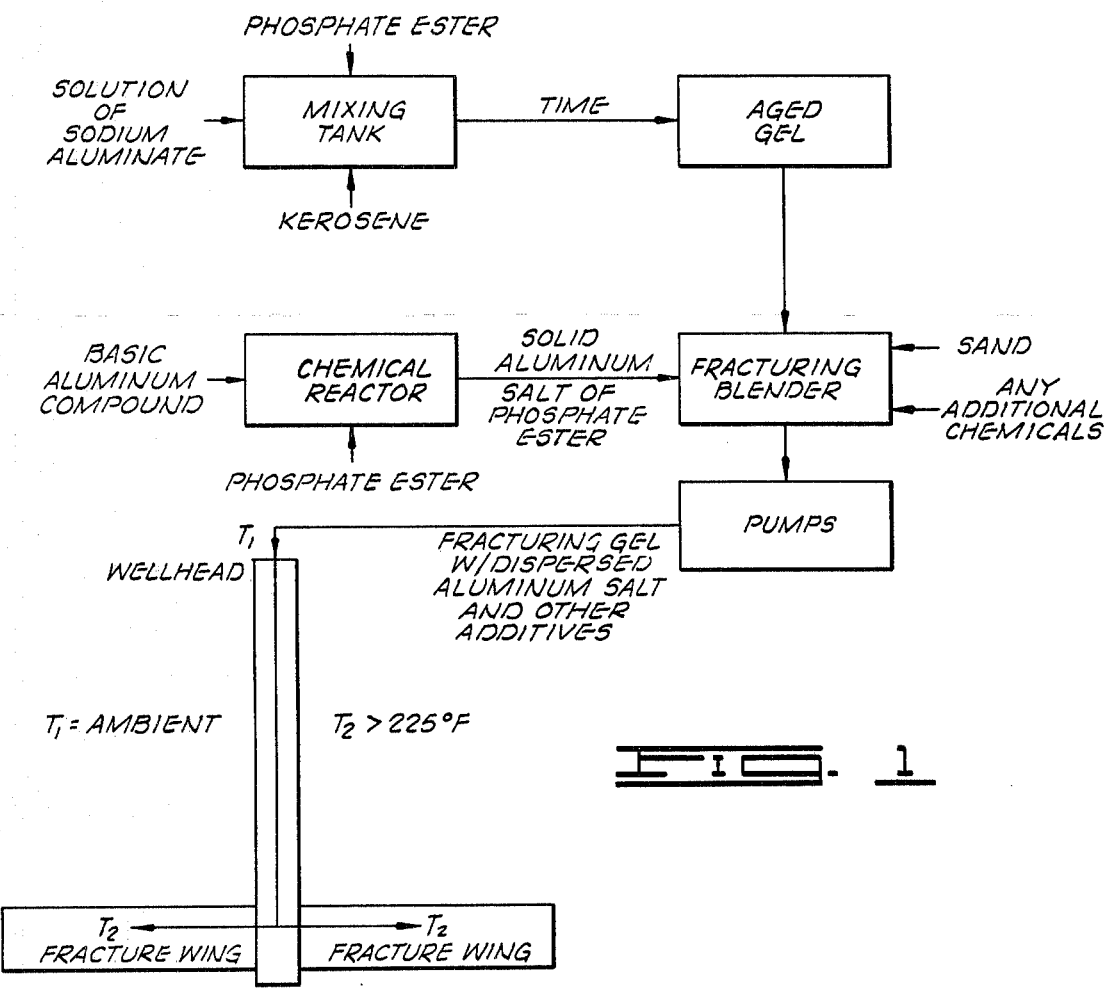

United States Patent [19]

Burnham

[11] 4,200,540
[45] Apr. 29, 1980

[54] METHOD FOR FRACTURING SUBTERRANEAN FORMATIONS

[75] Inventor: John W. Burnham, Duncan, Okla.

[73] Assignee: Halliburton Company, Duncan, Okla.

[21] Appl. No.: 898,059

[22] Filed: Apr. 20, 1978

[51] Int. Cl.² ............................................. E21B 43/26
[52] U.S. Cl. ............................. 252/8.55 R; 166/308
[58] Field of Search ............. 252/8.55 R, 8.5 M, 32.5; 166/283, 308

[56] References Cited

U.S. PATENT DOCUMENTS

| | | | |
|---|---|---|---|
| 2,382,043 | 8/1945 | Farrington et al. | 252/32.5 |
| 3,757,864 | 9/1973 | Crawford et al. | 137/13 X |
| 4,031,014 | 6/1977 | Griffin | 252/8.55 |

*Primary Examiner*—Herbert B. Guynn
*Attorney, Agent, or Firm*—Thomas R. Weaver; John H. Tregoning; William R. Laney

[57] ABSTRACT

A method for fracturing subterranean formations at a subterranean environmental temperature above 150° F. which includes the steps of initially preparing an oil base gel consisting essentially of a hydrocarbon liquid containing an aluminum salt of a phosphate ester, then adding to said gel, at a temperature below about 150° F., a gel-insoluble, solid aluminum salt of a phosphate ester to form a pumpable dispersion, and finally pumping the slurry down a bore hole and into the formation to be fractured.

6 Claims, 3 Drawing Figures

METHOD FOR FRACTURING SUBTERRANEAN FORMATIONS

This invention relates to methods for fracturing subterranean formations to enhance oil and gas production, and more particularly, to methods for fracture stimulation of oil and/or gas wells in which the temperature at the location where the fracture is to be stimulated is in excess of about 150° F.

Hydraulic fracturing is a widely used method for stimulating petroleum producing subterranean formations and is commonly performed by contacting a subterranean formation with a viscous fracturing fluid having particulated solids, hereinafter referred to as propping agents, suspended therein, applying sufficient pressure to the fracturing fluid to open a fracture in the subterranean formation and maintaining this pressure while injecting the fracturing fluid into the fracture at a sufficient rate to extend the fracture into the subterranean formation. When the pressure on the fracturing fluid is reduced, the propping agent prevents the complete closure of the fracture.

Viscous liquids are desirably used as fracturing fluids because they have been found to remain in the fracture long enough to permit buildup and maintenance of sufficient pressure to open a fracture. Additionally, a viscous fracturing fluid can support propping agents suspended therein.

A significant problem is encountered where the bottom hole temperature or the environmental temperature at the locus of the fracture which is to be propagated or enlarged exceeds about 200° F. At such elevated temperature, many types of fluids introduced to the formation for the purpose of fracturing the formation undergo a reduction in viscosity, and therefore in their fracturing capability. If an attempt is made to increase the viscosity of the oil base fracturing fluid as it is made up and prior to pumping it into the subterranean location, the increased viscosity results in difficulty in pumping the fluid, and problems are encountered in handling the relatively high viscosity fluid at the surface. These difficulties are especially acute where it is undertaken to add an amount of a solid proppant to the fracturing fluid. Significant decreases in viscosity at temperatures exceeding 200° F. have been observed in the case of fracturing fluids prepared from hydratable polysaccharides and hydratable polyacrylamides.

In one specific type of formation fracturing which has heretofore been practiced, an oil base fracturing fluid which consists essentially of a refined hydrocarbon containing an aluminum aliphatic phosphate has been used, and the fracturing method is carried out as described in U.S. Pat. No. 3,757,864. The fracturing fluid is prepared in the form of a pumpable gel by mixing the hydrocarbon with an aluminum salt of an aliphatic phosphate, and after the gel has been permitted to age for a selected period of time, the fracturing fluid is pumped downhole to the location of the formation to be fractured and, by application of pressure, a fracture is then developed or propagated due to the hydraulic pressure exerted by the fluid. Effectiveness of the fracturing is directly related to the viscosity of the gel utilized, with fracturing generally being more effective where the viscosity of the fluid used is higher. The described oil base fracturing fluid containing an aluminum salt of an aliphatic phosphate is usually limited in the concentration of the aluminum salt gelling agent to about 6.0 percent by weight, since above this concentration viscosity of the gel becomes sufficiently high that the fluid is very difficult to manipulate on the surface, and is difficult to pump into the well conduit and into the formation. The maximum tolerable concentration of the aluminum salt may, in some cases, be even considerably lower than 6.0 weight percent, depending upon the type of oil base liquid utilized. When the concentration of the aluminum salt gelling agent is maintained below the approximately 6.0 weight percent which is tolerable from the standpoint of handling and pumping, however, no significant increase in viscosity is realized in the fracture locus where the temperature at the fracturing location is above about 200° F., and, in fact, with increase of the temperature at the fracture location above this magnitude, a significant decrease of viscosity is generally experienced with this type of fracturing fluid.

The present invention relates to a method for fracturing subterranean formations which are at relatively higher temperatures, i.e., above 150° F. The method is especially effective for fracturing formations in which the temperature at the location to be fractured exceeds about 200° F.

The method of the invention can be broadly described as initially forming an aged gel by blending an aluminum salt of a phosphate ester with a hydrocarbon base liquid in a sufficiently low concentration of salt to enable the viscosity of the gel to remain low enough that the gel can be relatively easily handled and pumped. To the aged gel is then added a gel-insoluble solid aluminum salt of a phosphate ester to form a dispersion or suspension of the solid particles of the salt in the gel. The preparation of the gel, and the addition of the solid salt to form the dispersion are generally carried out at above-ground ambient temperatures and, in any event, at a temperature which is less than about 150° F. After formation of the dispersion, it is pumped downhole to the subterranean formation to be fractured, and is employed, while under elevated pressure, for creating or propagating a fracture in the formation. At the relatively higher temperature of the formation, and particularly at a temperature above about 150° F., the fracturing fluid undergoes an increase in viscosity, and concurrently the suspended solid aluminum salt commences to dissolve in the hydrocarbon base liquid so that a homogeneous gel having a relatively high viscosity is developed and functions effectively in the fracturing operation.

When the described procedure for fracturing is employed, no difficulty is encountered in handling and pumping the materials required to make up the dispersion, or the dispersion itself, at the ambient temperatures generally encountered at the surface over the formation to be fractured. Moreover, the higher temperatures encountered at the underground fracturing location effectively homogenize the mixture by causing the solid aluminum salt particles to go into solution and increase the viscosity of the fracturing fluid. Surprisingly, the higher viscosity fracturing fluid does not break down or become deleteriously affected at temperatures even as high as about 225° F. By controlling the chemical constitution and particle size of the solid aluminum phosphate particles added to the aged gel in making up the dispersion, the temperature at which these particles commence to go into solution, and at which the viscosity of the gel begins to increase, can be selectively determined and controlled.

In the accompanying drawings, FIG. 1 is a schematic process flow sheet illustrating the method of fracturing of the invention.

Figure 2:
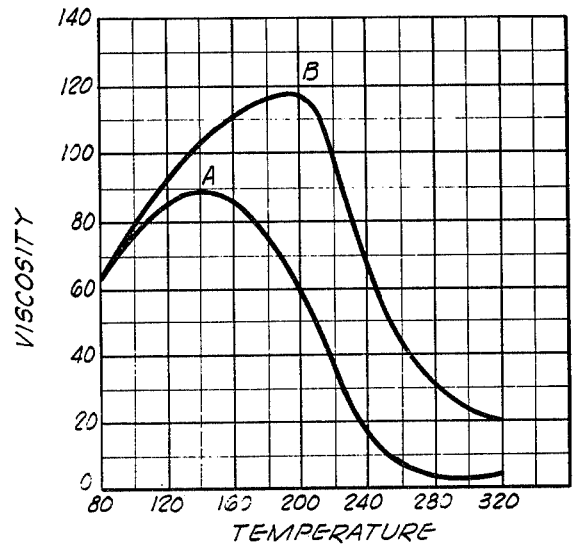

FIG. 2 is a graph in which the temperature-viscosity characteristic of a fracturing fluid composition prepared in accordance with the present invention is compared with that of a fracturing fluid prepared according to U.S. Pat. No. 3,757,864.

Figure 3:
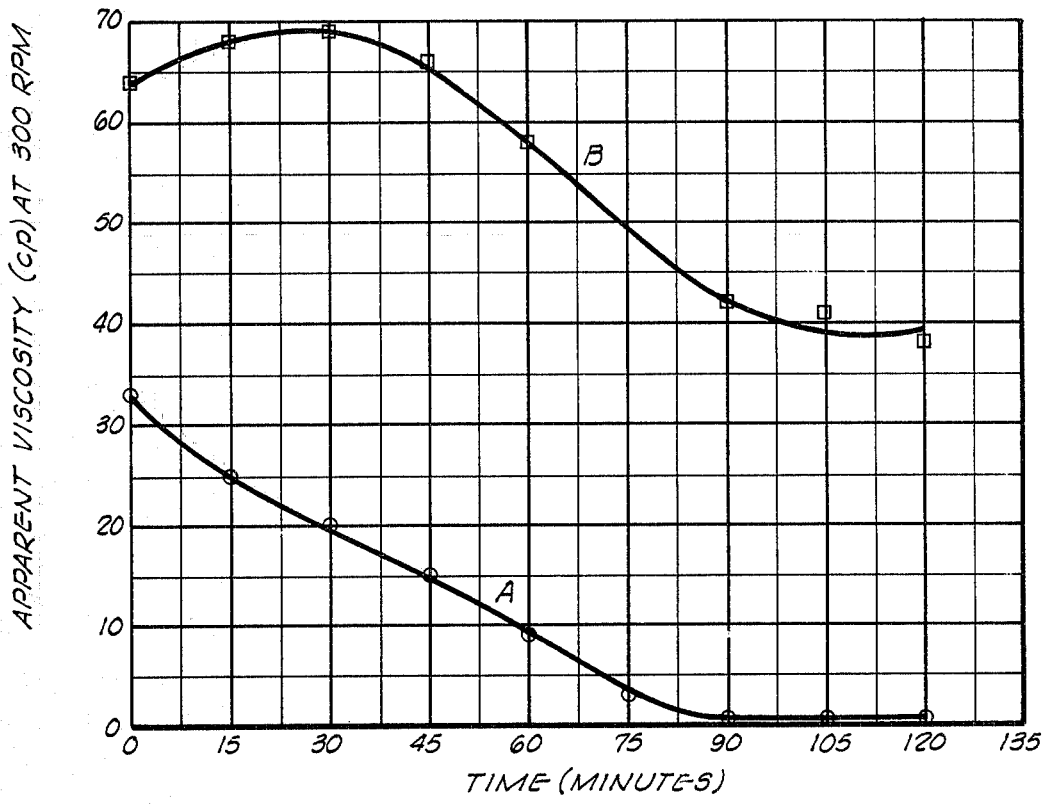

FIG. 3 is a graph which compares the viscosity-time characteristics of a fracturing fluid prepared in accordance with the invention and an aged gel which does not contain an added solid aluminum salt.

The aluminum salts used in initially making up the aged gel, as well as those then added in solid form to the aged gel to form a dispersion, all as described above as carried out in practicing the method of the invention, are broadly aluminum aromatic phosphates, aluminum oxaalkyl phosphates, aluminum oxaalkyl alkyl phosphates and the aluminum aliphatic salts described in Crawford U.S. Pat. No. 3,757,864. The salts employed in the preparation of the aged gel are selected from the group of salts having the structural formulae:

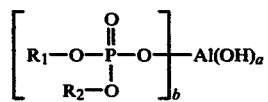  (1)

where
a = 0 to 2,
b = 1 to 3,
and the sum of a+b=3;
$R_1$ = an aryl or aliphatic-aryl group containing from 6 to 24 carbon atoms, and
$R_2$ = an aryl, aliphatic-aryl or aliphatic group containing from 1 to 24 carbon atoms, or H;
provided, however, that where $R_1$ is an aryl group, then $R_2$ must be either an aliphatic group containing at least six carbon atoms, or an aliphatic-aryl group containing at least twelve carbon atoms; and provided that if $R_2$ is an aryl group, then $R_1$ is an aliphatic-aryl group containing at least 12 carbon atoms; and provided that if both $R_1$ and $R_2$ are aliphatic-aryl groups, one of $R_1$ and $R_2$ contains at least 12 carbon atoms; and provided that where $R_1$ is an aliphatic-aryl containing less than 12 carbon atoms and $R_2$ is aliphatic, $R_2$ must contain at least six carbon atoms; and

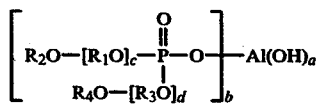  (2)

where
a = 0 to 2,
b = 1 to 3,
c = 1 to 5,
d = 1 to 5,
and the sum of a+b=3;
$R_1O$ and $R_3O$ = an alkyloxy, alkenyloxy or alkynyloxy group containing from 1 to 18 carbon atoms, or $CH_2CH(CH_3)O$, or $CH_2CH_2O$, and
$R_2O$ and $R_4O$ = an alkyloxy, alkenyloxy or alkynyloxy group containing from 1 to 18 carbon atoms.

$R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$, and provided further that where either $R_1O$ or $R_3O$ is neither $CH_2CH(CH_3)O$ nor $CH_2CH_2O$, then the respective $R_2O$ or $R_4O$ group otherwise bonded thereto shall be deleted; and

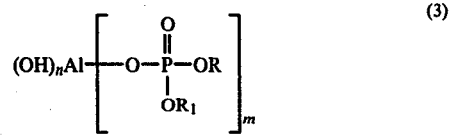  (3)

where
m = 1 to 3,
n = 0 to 2,
and the sum of n+m=3; and
R and $R_1$ are independently $C_1$ to $C_{20}$ alkyls, or $C_2$ to $C_{20}$ alkenyls, or $C_2$ to $C_{20}$ alkynyls, or R or $R_1$, but not both, may be H;
provided, however, that where either the R or $R_1$ contains fewer than six carbon atoms, then the other of R or $R_1$ contains at least seven carbon atoms.

The aluminum aromatic phosphates having the structural formula (1) appearing above include aluminum aryl phosphates, aluminum aliphatic-aryl phosphates, aluminum aryl aliphatic phosphates, aluminum aliphatic-aryl aliphatic phosphates and aluminum aryl aliphatic-aryl phosphates. In these compounds the term "aliphatic" is used to mean saturated, olefinic and/or acetylenic straight and/or branched chain constituents. The term "aryl" is defined as a phenyl group, and the term "aliphatic-aryl" is defined as including phenyl groups substituted by an aliphatic hydrocarbon substituent as this term is defined. In each case, the aromatic phosphate constituting the precursor of the aluminum salts includes an aryl or aliphatic hydrocarbon-aryl substituent containing from about 6 to about 24 carbon atoms. The most preferred salts within this group are aluminum aryl aliphatic phsophates in which the aliphatic hydrocarbon substituent contains from 6 to 18 carbon atoms.

A partial listing of aluminum phosphate salts constituting additives of the invention includes aluminum phenyl hexadecyl phosphate, aluminum bis(4-dodecylphenyl) phosphate, aluminum 3-penta-dec-2-enylphenyl ethyl phosphate, aluminum 4-dodecylphenyl ethyl phosphate, aluminum tolyl octadecyl phosphate, aluminum phenyl 2-tetradecyl phosphate, aluminum 3-octadecylphenyl phosphate, and aluminum 2-ethylphenyl tetradecyl phosphate.

The aluminum salts which conform to structural formula (2) above can be the aluminum salts of both mono- and diesters having either one or two oxaalkyl substituents, with the term "alkyl" included within the term "oxaalkyl" being used in the generic sense to include straight and branched chain, saturated and unsaturated aliphatic groups. The most preferred salts of this type are the aluminum salts of phosphate diesters in which the oxaalkyl substituent contains from about 16 to about 24 carbon atoms and the second ester substituent in the salt contains from about 1 to about 16 carbon atoms.

A partial listing of aluminum salts constituting compounds of the type contemplated by structural formula (2) above includes: aluminum bis(7,10-dioxadodecyl)

phosphate; aluminum 4-methyl-2-oxabutyl hexyldecyl phosphate; aluminum 4,7-dioxanonyl oxadecyl phosphate; aluminum octadecyl 2-oxabutyl phosphate; aluminum bis(14-oxahexadecyl) phosphate; aluminum 3-oxapentyl octadecyl phosphate; aluminum 5-methyl-7,10-dioxadodecyl tetradecyl phosphate; aluminum 11,14-dimethyl 9,12-dioxatetradecyl phosphate and aluminum 6-butyl-12-methyl-10-oxadodecyl hexadecyl phosphate.

Examples of aluminum salts conforming to formula (3) above are the aluminum salts of octylethylorthophosphoric acid ester, propynyldecynylorthophosphoric acid ester, methyltetradecylorthophosphoric acid ester, methyldodecylorthophosphoric acid ester, ethyltetradecylorthophosphoric acid ester and octyldodecylorthophosphoric acid ester.

The methods by which the aged gel prepared in the initial steps of the process of the invention is made up are generally well known in the art. One such procedure is that described in *Industrial and Engineering Chemistry*, Vol. 34, page 20 et seq. Other methods are alluded to in U.S. Pat. No. 3,757,864. In general, the procedure entails reacting a phosphorous compound, such as phosphorous pentoxide or phosphorous oxychloride, with a selected alcohol or mixture of alcohols to form the phosphoric acid ester precursor of the salt desired. The ester is then reacted with a basic aluminum compound. Typical usable aluminum compounds are sodium aluminate, aluminum isopropoxide, and hydrated alumina.

The aluminum salt as thus synthesized is next added, also in accordance with well understood procedures, to an oil base or hydrocarbon-type liquid suitable for use in fracturing. The oil base liquid can be any of various previously used hydrocarbon materials, including kerosene, diesel oil, gas oil, fuel oil and certain types and mixtures of crude oil. Kerosene is the preferred base material. The salt can be made up prior to adding to the oil base liquid, or can be formed in situ by addition of the phosphate ester and aluminum compound concurrently to the oil base liquid with concurrent mixing.

The amount of the aluminum salt placed in the oil base liquid in making up the initial aged gel in the preliminary steps of the process can be varied in accordance with a number of factors. In general, however, the concentration of the aluminum salt in the oil base liquid should not exceed about 6.0 weight percent. If the prescribed concentrations are exceeded, the viscosity of the aged gel under preparation will be so high that the gel will be very difficult to handle, and to pump to the subterranean fracture location, and one of the major objectives of the invention will thus be largely defeated.

In the case of any of the aluminum salts described, such salts can be formed in situ in the oil base liquid by initially adding to the oil base liquid a phosphate ester in appropriate amount, followed by the addition of the aluminum compound which is to be reacted therewith to form the aluminum salt. At the time of addition of the aluminum compound to the oil, it is beneficial to add a small amount of sodium hydroxide and water. For purposes of illustration, the use of an aliphatic phosphate ester of the type employed as a precursor in the preparation of a compound conforming to structural formula (3) above is referred to in the schematic illustration of the process. It will be understood, of course, that compounds of the sort defined by structural formulae (1) and (2) can also be used pursuant to the process scheme with equal facility. Further, though an aqueous solution of sodium aluminate is shown as used for the purpose of preparing, first the aged gel, and then the solid salt added to the aged gel to form the dispersion pumped into the fracture, it will be understood that other basic aluminum compounds can also be used.

In the preparation of the aged gel, the phosphate ester and aqueous solution of sodium aluminate or other suitable aluminum compound are added to a mixing tank which contains kerosene, and the aluminum aliphatic phosphate compound is formed in situ in the oil base liquid. As previously indicated, the amounts of the aluminate and phosphate ester which are added to kerosene are limited such that, at the ambient temperature at the mixing site and prevailing in the vicinity of the pumps used for pumping the final dispersion downhole, the dispersion formed will be of sufficiently low viscosity that no difficulty in handling and pumping is experienced. Where an aluminum aliphatic phosphate conforming to structural formula (3) above is utilized, the amounts of aliphatic phosphate ester and aluminate compound added to the kerosene are such that the aluminum salt formed in situ preferably does not exceed a concentration of about 2 weight percent.

After thoroughly mixing the kerosene and reactants, the mixture is permitted to age for a period of from about three minutes up to about twenty hours. During this time, final reaction of the ester and aluminate compounds occurs to produce the aluminum salt which is dissolved in the kerosene, and the resulting system undergoes an increase in viscosity as the reaction goes to completion.

When the aged gel has been prepared in the manner described, the next step of the process of the invention involves adding to this gel, a solid aluminum salt selected from the group of salts having the structural formulae:

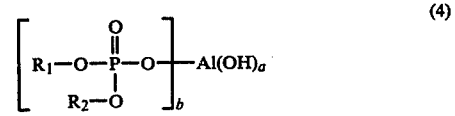

(4)

where
a=0 to 2,
b=1 to 3,
and the sum of a+b=3;
$R_1$ =an aryl or aliphatic-aryl group containing from 6 to 24 carbon atoms, and
$R_2$ =an aryl, aliphatic-aryl or aliphatic group containing from 1 to 24 carbon atoms, or H; and

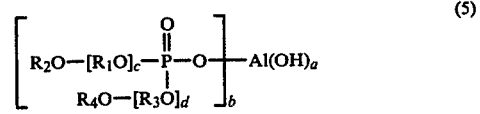

(5)

where
a=0 to 2,
b=1 to 3,
c=1 to 5,
d=1 to 5,
and the sum of a+b=3;
$R_1O$ and $R_3O$ =an alkyloxy, alkenyloxy or alkynyloxy group containing from 1 to 18 carbon atoms, or $CH_2CH(CH_3)O$, or $CH_2CH_2O$, and $R_2O$ and $R_4O$ = an alkyloxy, alkenyloxy or alkynyloxy group containing from 1 to 18 carbon atoms, with either $R_2$ or $R_4$ containing at least 14 carbon atoms.

$R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$, and provided further that where either $R_1O$ or $R_3O$ is neither $CH_2CH(CH_3)O$ nor $CH_2CH_2O$, then the respective $R_2O$ or $R_4O$ group otherwise bonded thereto shall be deleted; and

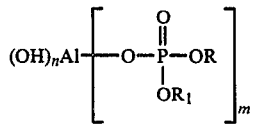
(6)

where
m = 1 to 3,
n = 0 to 2,
and the sum of n+m = 3, and
R and $R_1$ are independently $C_1$ to $C_{20}$ alkyls, or $C_2$ to $C_{20}$ alkenyls, or $C_2$ to $C_{20}$ alkynyls, or R or $R_1$, but not both, may be H; and provided further that at least one of R or $R_1$ shall contain at least 14 carbon atoms.

It will be noted at this point that the types of solid aluminum salt compounds useful at this point in the process include most of the aluminum salts described above by structural formulae (1), (2) and (3), provided that such salts are solids at ambient temperatures, which will generally be in the range of from about 60° F. to about 120° F., but which shall in any event be below about 150° F. Mixtures of the solid aluminum salts can, of course, be utilized. In addition to the solid character of the salts added to the aged gel, the salts are insoluble in the gel at the prevailing ambient temperature at or near the surface at the point of incorporation into the gel.

As shown in the FIG. 1 diagrammatic illustration, addition of the aluminum salt is made at ambient temperature in a blending device to procure a dispersion of the solid salt in the gel. The solid salt is initially formed in a suitable reactor, and in accordance with well-known procedures, by adding the sodium aluminate, or other suitable basic aluminum compound and the appropriate phosphate ester to the reactor. Upon completion of the reaction, the solid aluminum salt which results is then introduced to a blender, and is there thoroughly blended with the aged gel. As indicated above, at the ambient temperatures generally prevailing at the wellhead or blending site above ground, the solid aluminum salt particles are insoluble in the gel, and the blending procedure will result in the formation of a dispersion in which the solid particles are thoroughly dispersed and suspended in the relatively thick, yet pumpable gel.

The amount of the solid aluminum salt which is used will be determined in part by the ultimate downhole viscosity of the fracturing fluid which is desired, and also, in part, by the other solid additives which it may be desired to incorporate in, and have carried by, the oil base liquid constituting the principal component of the aged gel. Typically, proppant materials, such as sand, glass or ceramic beads, will be added to the blender and incorporated in the dispersion along with the solid particles of aluminum salt. Other types of fracturing fluid additives well known in the art can also be added at this point. In general, from about 5 to about 150 pounds of the solid aluminum salt will be added to about 1000 gallons of the aged gel in preparing the dispersion.

After thoroughly blending the solid salt in the aged gel, along with a proppant or other additives, the resulting dispersion is pumped via suitable pumping devices into the well and is ultimately caused to enter the two wings of a preliminary fracture for purposes of propagating or enlarging the fracture. As FIG. 1 depicts, prior to being passed into and down a well bore, the temperature of the dispersion is the ambient temperature, $T_1$, at the well head and in the vicinity of the blending and pumping equipment. At the subterranean location of the fracture, however, a substantially higher temperature, $T_2$, generally prevails, and may range from a temperature of as low as about 130° F. to temperatures in excess of 300° F. At these higher temperatures, the aluminum salts added to the gel go into solution.

The following examples are illustrative of the practice of the invention.

EXAMPLE 1

A solid aluminum salt suitable for addition to an aged gel to prepare the slurry or dispersion used in fracturing in accordance with the invention is made by adding 70 g of anhydrous ethanol and 392.7 g of a commercial mixture of hexadecanol and octadecanol to a reaction flask under a blanket of nitrogen. The mixture of hexadecanol and octadecanol contains approximately 60 weight percent of hexadecanol, and 40 weight percent of octadecanol, and is sold under the trade name ALFOL 1618. 142 g of phosphorus pentoxide are then slowly added to the flask, and in the course of addition, the temperature of the reaction mixture rises to 120° F. The flask is then heated to approximately 280° F., and is held at that temperature for 30 minutes. 52 g of aluminum hydroxide are next added to the flask, with heating, to effect neutralization. Upon completion of neutralization, water is removed under vacuum from the flask, and the aluminum salt product solidifies to a brittle mass which can be easily ground to a powder.

EXAMPLE 2

FIG. 2 of the drawing graphically compares the temperature vs. viscosity characteristic of a fracturing fluid composition prepared in accordance with the present invention with a fracturing fluid prepared by the method described in U.S. Pat. No. 3,757,864. The viscosities, in centipoise units, are determined using a Model 50 FANN viscometer equipped with a No. 1 spring and a standard bob and sleeve.

The temperature-viscosity curve, B, shows the variation of viscosity with temperature in the case of a slurry fracturing composition constituted by 0.58 weight percent of powdered solid aluminum phosphate salt, prepared as described in Example 1, dispersed in an aged kerosene-base gel. The aged gel contains 1.18 weight percent of an aluminum phosphate salt. The salt is prepared in situ in the kerosene by adding initially to the kerosene an ester derived, as described in Example 1, from a mixture of hexanol, octanol, decanol and anhydrous ethanol, and then adding sodium aluminate to the kerosene. The curve, A, on the graph depicts the same characteristics of the same aged gel alone (i.e., without the addition of the solid aluminum phosphate salt in order to make the dispersion or slurry of the invention). It will be noted that the addition of the solid aluminum phosphate salt to the aged gel results in the viscosity of the slurry continuing to increase up to a temperature of about 200° F., at which temperature a viscosity of about 120 centipoises is attained. In the case of the aged gel to which none of the solid aluminum phosphate salt has been added, the gel commences to decrease in viscosity at a temperature above about 140° F. after attaining a maximum viscosity of about 85 centipoises at that temperature.

A comparison of curves A and B in FIG. 2 clearly demonstrates that the addition of even a small amount of solid aluminum phosphate salt to the aged gel enables the fracturing composition thus formed to continue to increase in viscosity at relatively high temperatures, and to attain a substantially higher viscosity than that which is reached when using the aged gel alone.

EXAMPLE 3

As a further example of the preparation of another solid aluminum phosphate salt suitable for addition to an aged gel to prepare the dispersion of the invention, such solid salt is prepared by initially adding 373.2 g of hexadecanol and 70 g of anhydrous ethanol to a reaction flask under a blanket of nitrogen. 142 g of phosphorus pentoxide are then added while the reaction mixture is at a temperature of between 120° F. and 130° F. The contents of the flask are then heated to 280° F. following the addition, and are maintained at that temperature for 30 minutes. 52 g of aluminum hydroxide are then added, resulting in cooling of the reaction mixture to 200° F. After the addition of the aluminum hydroxide, the reaction mixture is heated to about 250° F., followed by removal of the water of reaction under vacuum. The flask and its contents are then cooled to produce a solid, brittle reaction product which is easily ground to a powder.

EXAMPLE 4

To a reaction container are added 303 g of a commercial mixture of hexadecanol, octadecanol and eicosanol and 52.4 g of anhydrous ethanol. The commercial mixture of $C_{16}$–$C_{20}$ alcohols is sold under the trade name ALFOL 1620. 108 g of phosphorus pentoxide are then added slowly to the reaction mixture at a temperature of about 120° F. Following the addition of the phosphorus pentoxide, the reaction mixture is heated to 280° F., and is retained at this temperature for 30 minutes. 38.2 g of aluminum hydroxide are then added to the reaction mixture, and the mixture is subsequently heated for an additional 30 minutes at a temperature of about 250° F. The container is then placed under vacuum to remove the water of reaction. Upon cooling of the reaction container and its contents, the reaction product undergoes solidification.

EXAMPLE 5

In FIG. 3 of the drawings, the viscosity stability of an aged kerosene-base gel, prepared in the manner described in Examples 1 and 2, and containing 0.44 weight percent of a commercially available gel breaker, is compared with the viscosity stability of the same aged gel to which has been added both the gel breaker and 0.58 weight percent of the solid aluminum phosphate salt prepared as described in Example 4. The graph of FIG. 3 illustrates with curve B, the time stability, at a constant temperature of 250° F., of the composition which contains the solid particles of the solid aluminum aliphatic phosphate salt prepared as described in Example 4, and also illustrates with curve A, the corresponding stability at the same constant temperature of the aged gel to which none of the solid aluminum aliphatic phosphate salt is added.

It will be perceived in referring to FIG. 3 that the initial viscosity of the solution containing the added aluminum salt is nearly twice as high as the initial viscosity of the aged gel which does not contain any added aluminum salt. It is apparent, moreover, in referring to the graph, that the viscosity of the gel to which none of the solid salt is added decreases substantially continuously with time, and that the gel becomes essentially useless after about 90 minutes. The gel to which the solid salt particles have been added, however, actually increases slightly in viscosity for about the first 30 minutes after preparation of the composition, and then gradually decreases in viscosity to a point of leveling off in viscosity which occurs at about 105 minutes after preparation. It will be noted that even at this time, the viscosity of the solution is higher than the initial viscosity of the aged gel which does not contain any of the solid aluminum salt particles.

EXAMPLE 6

An oil and gas producing well 15,000 feet in depth is fracture treated using a slurry or dispersion (at surface ambient temperature) of solid aluminum aliphatic phosphate in a kerosene base gel. The well has a static bottom hole temperature of 280° F. The aged gel, as prepared on the surface, and prior to the addition of the solid aluminum salt thereto, contains an aluminum aliphatic phosphate salt prepared by adding 8 gallons of a phosphate ester (prepared by reacting phosphorus pentoxide with a mixture of hexanol, octanol, decanol and ethanol) and 2 gallons of sodium aluminate-sodium hydroxide solution to 72,000 gallons of kerosene. The gel as thus prepared is aged for about 3 hours. 0.9 weight percent (based on the total weight of the dispersion formed) of solid aluminum eicosyl octadecyl hexadecyl ethyl phosphate is then blended into the aged gel to form the slurry. The slurry is pumped downhole at a rate of 12 barrels per minute and a pumping pressure of approximately 12,000 psi. In the course of pumping the slurry into the well bore, a high density proppant material is added to the slurry to enable a total of 47,400 pounds of the proppant to be placed in the fracture zone.

EXAMPLE 7

An oil and gas producing well having a depth of 8,700 feet is fracture treated using an oil base slurry of solid aluminum aliphatic phosphate prepared in accordance with the present invention. The static bottom hole temperature of the well is 225° F. The base fluid used in forming the slurry is No. 2 diesel oil. To 40,000 gallons of the diesel oil is initially added an aluminum salt prepared by mixing, in situ, 8 gallons of an aliphatic phosphate ester and 2 gallons of sodium aluminate-sodium hydroxide solution. After aging the gel which is formed upon reaction of the ester and sodium aluminate-sodium hydroxide solution, 0.6 weight percent (based on the total weight of the slurry formed) of solid aluminum eicosyl octadecyl hexadecyl ethyl phosphate is added to the aged gel to form the slurry. The slurry is pumped downhole at a pumping rate of 12 barrels per minute and a pumping pressure of approximately 5,800 psi. In the course of pumping the slurry into the fracturing zone, 10-20 sand is added to the slurry as a proppant material. A total of 52,000 pounds of sand is placed in the fracture zone.

From the foregoing description of the invention, it will be perceived that a useful, relatively easily practiced method for fracturing subterranean formations has been proposed, and contemplates the usage of a temperature stable dispersion as a fracturing fluid which is suitable for use at relatively elevated bottom hole temperatures. Although certain specific embodiments of the invention have been herein described in order to clearly illustrate the basic principles which underlie the invention, and to provide sufficient guidance to those skilled in the art to enable them to practice the invention without difficulty, it will be understood that various changes and alterations in the exemplary compositions and methods which are specifically alluded to herein can be effected without departure from such basic principles. Changes and innovations of this type are therefore deemed to be circumscribed by the spirit and scope of the invention, except as the same may be necessarily limited by the appended claims or reasonable equivalents thereof.

What is claimed is:

1. A method for fracturing a subterranean formation at a location where the temperature exceeds about 150° F. comprising:

adding at a temperature of less than about 150° F. to a hydrocarbon liquid, a phosphoric acid ester and a basic aluminum compound to form, in situ, at least one aluminum salt selected from the group having the structural formulae:

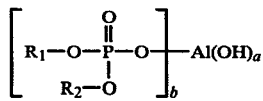

where
a=0 to 2,
b=1 to 3,
and the sum of a+b=3;
$R_1$=a phenyl or aliphatic hydrocarbon substituted-phenyl group containing from 6 to 24 carbon atoms; and
$R_2$=a phenyl, aliphatic hydrocarbon substituted-phenyl or aliphatichydrocarbon group containing from 1 to 24 carbon atoms, or H; provided, however, that where $R_1$ is a phenyl group, then $R_2$ must be either an aliphatic hydrocarbon group containing at least 6 carbon atoms, or an aliphatic hydrocarbon substituted-phenyl group containing at least 12 carbon atoms; and provided that if $R_2$ is a phenyl group, then $R_1$ is an aliphatic hydrocarbon substituted-phenyl group containing at least 12 carbon atoms; and provided that if both $R_1$ and $R_2$ are aliphatic hydrocarbon substituted-phenyl groups, one of $R_1$ or $R_2$ contains at least 12 carbon atoms; and provided that where $R_1$ is an aliphatic hydrocarbon substituted-phenyl containing less than 12 carbon atoms and $R_2$ is aliphatic hydrocarbon, $R_2$ must contain at least 6 carbon atoms; and

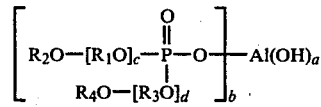

where
a=0 to 2,
b=1 to 3,
c=1 to 5,
d=1 to 5,
and the sum of a+b=3;
$R_1O$ and $R_3O$=an alkyloxy, alkenyloxy or alkynyloxy group containing from 1 to 18 carbon atoms, or $CH_2CH(CH_3)O$, or $CH_2CH_2O$, and
$R_2O$ and $R_4O$=an alkyloxy, alkenyloxy or alkynyloxy group containing from 1 to 18 carbon atoms, and wherein
$R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$, and provided further that where either $R_1O$ or $R_3O$ is neither $CH_2CH(CH_3)O$ nor $CH_2CH_2O$, then the respective $R_2O$ or $R_4O$ group otherwise bonded thereto shall be deleted;
and

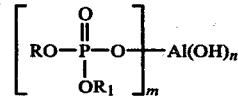

where
m=1 to 3,
n=0 to 2,
and the sum of n+m=3; and
R and $R_1$ are independently $C_1$ to $C_{20}$ alkyls, or $C_2$ to $C_{20}$ alkenyls, or $C_2$ to $C_{20}$ alkynyls, or R or $R_1$, but not both, may be H; provided, however, that where either R or $R_1$ contains fewer than 6 carbon atoms, then the other of R or $R_1$ contains at least 7 carbon atoms;

aging the salt-containing hydrocarbon for a period of from about 3 minutes to about 20 hours to form a pumpable gel;

adding to said gel, at a temperature below about 150° F., at least one aluminum salt insoluble in said gel at the temperature of the addition in solid particulate form to form a dispersion of said solid salt and said gel, said added solid aluminum salt being selected from the group of compounds having the strutural formulae:

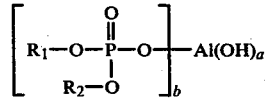

where
a=0 to 2,
b=1 to 3,
and the sum of a+b=3;

$R_1$ = a phenyl or aliphatic hydrocarbon substituted-phenyl group containing from 6 to 24 carbon atoms, and $R_2$ = a phenyl, aliphatic hydrocarbon substituted-phenyl or aliphatic group containing from 1 to 24 carbon atoms, or H;

and $$\left[ \begin{array}{c} O \\ \| \\ R_2O-[R_1O]_c-P-O \\ | \\ R_4O-[R_3O]_d \end{array} \right]_b Al(OH)_a \quad (5)$$

where
$a = 0$ to 2,
$b = 1$ to 3,
$c = 1$ to 5,
$d = 1$ to 5,
and the sum of $a + b = 3$;

$R_1O$ and $R_3O$ = an alkyloxy, alkenyloxy or alkynyloxy group containing from 1 to 18 carbon atoms, or $CH_2CH(CH_3)O$, or $CH_2CH_2O$, and $R_2O$ and $R_4O$ = an alkyloxy, alkenyloxy or alkynyloxy group containing from 1 to 18 carbon atoms, with either $R_2$ or $R_4$ containing at least 14 carbon atoms; and wherein $R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$, and provided further that where either $R_1O$ or $R_3O$ is neither $CH_2CH(CH_3)O$ nor $CH_2CH_2O$, then the respective $R_2O$ or $R_4O$ group otherwise bonded thereto shall be deleted;

and $$\left[ \begin{array}{c} O \\ \| \\ RO-P-O \\ | \\ OR_1 \end{array} \right]_m Al(OH)_n \quad (6)$$

where
$m = 1$ to 3,
$n = 0$ to 2,
and the sum of $n + m = 3$; and

R and $R_2$ are independently $C_1$ to $C_{20}$ alkyls, or $C_2$ to $C_{20}$ alkenyls, or $C_2$ to $C_{20}$ alkynyls, or R or $R_1$, but not both, may be H; and provided that at least one of R and $R_1$ shall contain at least 14 carbon atoms; then introducing said mixture into the formation to be fractured under pressure sufficient to accomplish fracturing.

2. The method defined in claim 1 wherein said solid particulate salt is introduced to said gel in an amount which is from about 5 to about 150 pounds per 1000 gallons of the aged gel of said mixture.

3. A method for fracturing subterranean formations at a location where the temperature exceeds about 150° F. which comprises:

adding a first solid aluminum salt of a phosphate ester to a pumpable, oil base gel consisting essentially of a hydrocarbon liquid containing, in solution, a second aluminum salt of a phosphate ester, with said addition being effected at the surface of the earth at a prevailing ambient temperature of less than about 150° F., to form a dispersion of particles of said added first aluminum salt in said gel, said second aluminum salt of a phosphate ester being selected from the group of compounds having the structural formulae:

$$\left[ \begin{array}{c} O \\ \| \\ R_1-O-P-O \\ | \\ R_2-O \end{array} \right]_b Al(OH)_a \quad (1)$$

where
$a = 0$ to 2,
$b = 1$ to 3,
and the sum of $a + b = 3$;

$R_1$ = a phenyl or aliphatic hydrocarbon substituted-phenyl group containing from 6 to 24 carbon atoms, and $R_2$ = a phenyl, aliphatic hydrocarbon substituted-phenyl or aliphatichydrocarbon group containing from 1 to 24 carbon atoms, or H;

provided, however, that where $R_1$ is a phenyl group, then $R_2$ must be either an aliphatic hydrocarbon group containing at least 6 carbon atoms, or an aliphatic hydrocarbon substituted-phenyl group containing at least 12 carbon atoms; and provided that if both $R_1$ and $R_2$ are aliphatic hydrocarbon substituted-phenyl groups, one of $R_1$ or $R_2$ contains at least 12 carbon atoms; and provided that where $R_1$ is an aliphatic hydrocarbon substituted-phenyl group containing less than 12 carbon atoms and $R_2$ is aliphatic hydrocarbon, $R_2$ must contain at least 6 carbon atoms;

and $$\left[ \begin{array}{c} O \\ \| \\ R_2O-[R_1O]_c-P-O \\ | \\ R_4O-[R_3O]_d \end{array} \right]_b Al(OH)_a \quad (2)$$

where
$a = 0$ to 2,
$b = 1$ to 3
$c = 1$ to 5,
$d = 1$ to 5,
and the sum of $a + b = 3$;

$R_1O$ and $R_3O$ = an alkyloxy, alkenyloxy or alkynyloxy group containing from 1 to 18 carbon atoms, or $CH_2CH(CH_3)O$, or $CH_2CH_2O$, and $R_2O$ and $R_4O$ = an alkyloxy, alkenyloxy or alkynyloxy group containing from 1 to 18 carbon atoms, and wherein $R_1O$ and $R_2O$ may differ from each other, but shall together contain from 1 to 24 carbon atoms, and $R_3O$ and $R_4O$ may differ from each other, but shall together contain from 1 to 20 carbon atoms, provided that at least one of $R_1O$ and $R_3O$ shall be either $CH_2CH(CH_3)O$ or $CH_2CH_2O$, and provided further that where either $R_1O$ or $R_3O$ is neither $CH_2CH(CH_3)O$ nor $CH_2CH_2O$, then the respective $R_2O$ or $R_4O$ group otherwise bonded thereto shall be deleted;

and

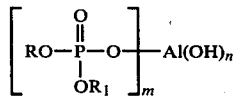

where
m=1 to 3,
n=0 to 2,
and the sum of n+m=3; and
R and $R_1$ are independently $C_1$ to $C_{20}$ alkyls, or $C_2$ to $C_{20}$ alkenyls, or $C_2$ to $C_{20}$ alkynyls, or R or $R_1$, but not both, may be H; provided, however, that where either R or $R_1$ contains fewer than 6 carbon atoms, then the other of R or $R_1$ contains at least 7 carbon atoms;
and mixtures thereof; and
wherein said first aluminum salt of a phosphate ester is selected from the group of compounds having the structural formulae:

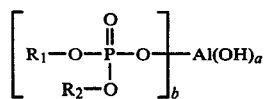

where
a=0 to 2,
b=1 to 3,
and the sum of a+b=3;
$R_1$ =a phenyl or aliphatic hydrocarbon substituted-phenyl group containing from 6 to 24 carbon atoms, and
$R_2$ =a phenyl, aliphatic hydrocarbon substituted-phenyl or aliphatic group containing from 1 to 24 carbon atoms, or H;
and

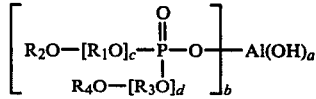

where
a=0 to 2,
b=1 to 3,
c=1 to 10,
d=to 10,
and the sum of a+b=3;
$R_1O$ and $R_3O$ =an alkyloxy, alkenyloxy or alkynyloxy group containing from 1 to 18 carbon atoms, or $CH_2CH(CH_3)O$, or $CH_2CH_2O$, and
$R_2O$ and $R_4O$ =an alkyloxy, alkenyloxy or alkynyloxy group containing from 1 to 18 carbon atoms, with either $R_2$ or $R_4$ containing at least 14 carbon atoms; and wherein
$R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$, and provided further that where either $R_1O$ or $R_3O$ is neither $CH_2CH(CH_3)O$ nor $CH_2CH_2O$, then the respective $R_2O$ or $R_4O$ group otherwise bonded thereto shall be deleted;
and

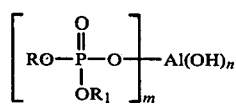

where
m=1 to 3,
n=0 to 2,
and the sum of n+m=3; and
R and $R_1$ are independently $C_1$ to $C_{20}$ alkyls, or $C_2$ to $C_{20}$ alkenyls, or $C_2$ to $C_{20}$ alkynyls, or R or $R_1$, but not both, may be H; and provided that at least one of R and $R_1$ shall contain at least 14 carbon atoms; then
pumping said dispersion down a well bore and into a formation to be fractured at a pressure sufficient to accomplish fracturing.

4. The method defined in claim 3 wherein said hydrocarbon is kerosene.

5. The method defined in claim 4 wherein said oil base gel contains an amount of said second aluminum salt of a phosphate ester which does not exceed about 6.0 weight percent.

6. The method defined in claim 3 and further characterized as including the additional step of dispersing a proppant in said oil base gel prior to pumping said dispersion down the well bore.

* * * * *